(12) United States Patent
Allen et al.

(10) Patent No.: US 8,111,132 B2
(45) Date of Patent: Feb. 7, 2012

(54) REMOTE CONTROLLING

(75) Inventors: William A. Allen, Westborough, MA (US); Robert Reimann, Brookline, MA (US); Herbert C. Knapp, Holliston, MA (US)

(73) Assignee: Bose Corporation, Framingham, MA (US)

( * ) Notice: Subject to any disclaimer, the term of this patent is extended or adjusted under 35 U.S.C. 154(b) by 44 days.

(21) Appl. No.: 10/752,391

(22) Filed: Jan. 6, 2004

(65) Prior Publication Data

US 2005/0146444 A1 Jul. 7, 2005

(51) Int. Cl.
*H04Q 9/00* (2006.01)

(52) U.S. Cl. .......................................... 340/5.1; 340/3.1

(58) Field of Classification Search ............. 340/825.24, 340/825.22, 825.72, 825.69, 5.61, 3.1, 13.24; 725/100, 39, 110; 341/176
See application file for complete search history.

(56) References Cited

U.S. PATENT DOCUMENTS

| | | | |
|---|---|---|---|
| 5,297,211 A | 3/1994 | Noro | |
| 5,469,152 A | 11/1995 | Yamamoto et al. | |
| 6,208,341 B1 * | 3/2001 | van Ee et al. | 715/716 |
| 6,367,078 B1 * | 4/2002 | Lasky | 725/52 |
| 6,425,129 B1 * | 7/2002 | Sciammarella et al. | 725/38 |
| 6,769,028 B1 * | 7/2004 | Sass et al. | 709/231 |
| 6,850,252 B1 | 2/2005 | Hoffberg | |
| 6,914,324 B2 | 7/2005 | Rapport et al. | |
| 6,941,324 B2 | 9/2005 | Plastina et al. | |
| 7,500,200 B2 | 3/2009 | Kelso et al. | |
| 2002/0031235 A1 * | 3/2002 | Abe | 381/94.5 |
| 2002/0057207 A1 * | 5/2002 | Sgambati et al. | 340/825.25 |
| 2003/0066080 A1 * | 4/2003 | Kamieniecki | 725/80 |
| 2003/0236582 A1 | 12/2003 | Zamir et al. | |
| 2004/0040039 A1 * | 2/2004 | Bernier | 725/46 |
| 2004/0175002 A1 * | 9/2004 | Christensen et al. | 381/59 |
| 2004/0225519 A1 | 11/2004 | Martin | |
| 2005/0021470 A1 | 1/2005 | Martin et al. | |
| 2005/0065625 A1 * | 3/2005 | Sass | 700/94 |
| 2005/0146444 A1 | 7/2005 | Allen et al. | |
| 2007/0006162 A1 | 1/2007 | Iho | |
| 2008/0005699 A1 | 1/2008 | Dvorak et al. | |
| 2008/0306936 A1 | 12/2008 | Ho et al. | |

FOREIGN PATENT DOCUMENTS

| | | |
|---|---|---|
| EP | 0 414 524 | 2/1991 |
| EP | 0 800 313 | 10/1997 |
| EP | 1 211 690 A | 6/2002 |
| EP | 1 548 740 A | 6/2005 |
| EP | 1 659 588 A | 5/2006 |
| EP | 1 755 018 A | 2/2007 |
| GB | 2 357 928 | 7/2001 |
| JP | 08-070408 | 3/1996 |
| WO | WO 02/095611 | 11/2002 |
| WO | WO02095611 | 11/2002 |

OTHER PUBLICATIONS

International Search Report for counterpart application PCT/US2008/065653, dated Feb. 19, 2009.

(Continued)

*Primary Examiner* — Vernal Brown
(74) *Attorney, Agent, or Firm* — Fish & Richardson P.C.

(57) ABSTRACT

A method includes providing, to a user of a control device, an indication of a value currently representative of a preset sound signal source, and simultaneously providing an indication of a possible new value of the preset.

6 Claims, 6 Drawing Sheets

OTHER PUBLICATIONS

Figure 1:
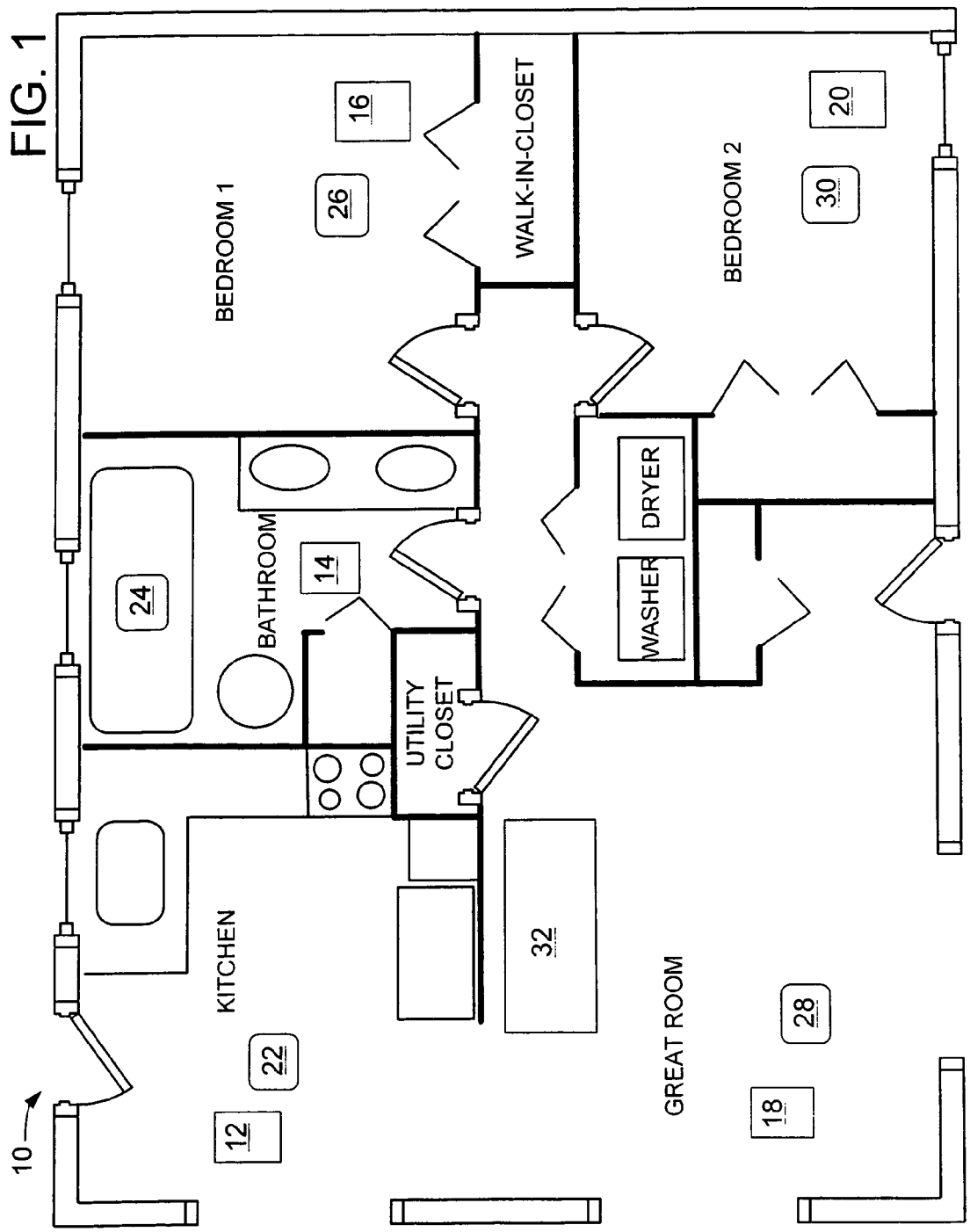

Japanese Patent Office Action for counterpart Application No. 2005-001343 dated Mar. 23, 2010, 6 pages.

International Preliminary Report on Patentability in counterpart application of PCT/US2008/065653 dated Jan. 21, 2010, 12 pages.

Japanese Office Action in counterpart Application No. 2005-001343 dated Nov. 24, 2010, 4 pages.

Japanese Office Action in counterpart Application No. 2004-373724 dated Aug. 17, 2010, 6 pages.

* cited by examiner

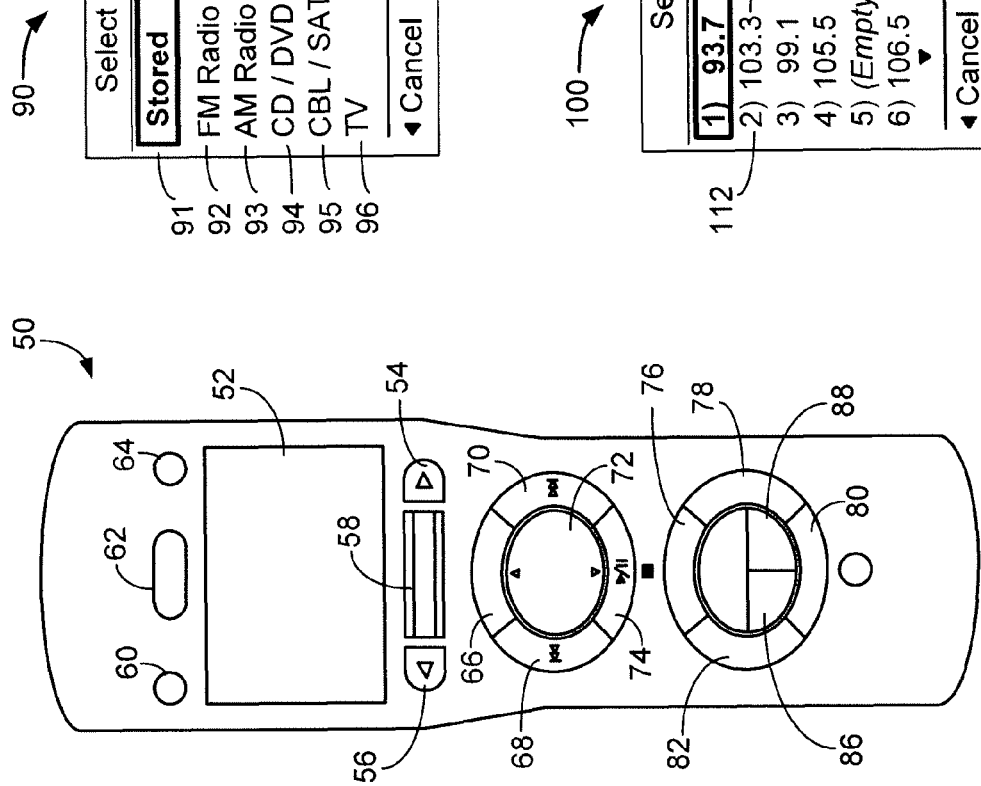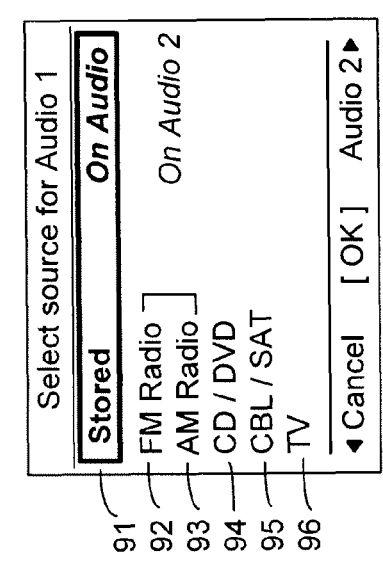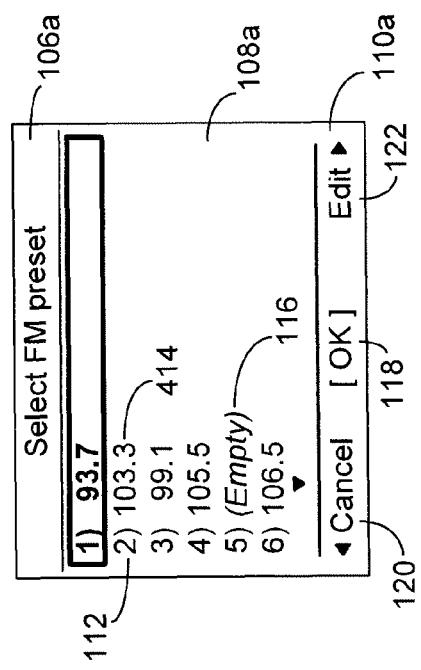

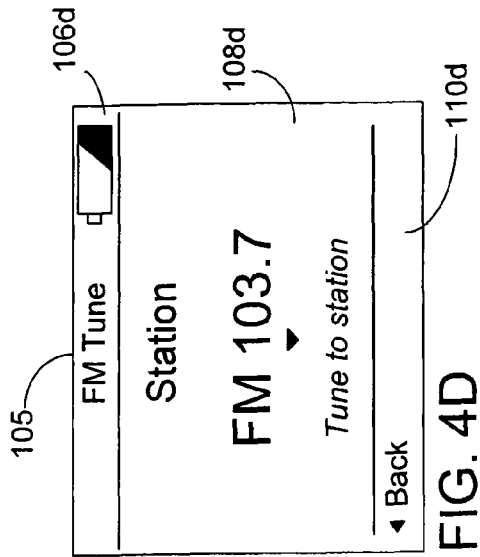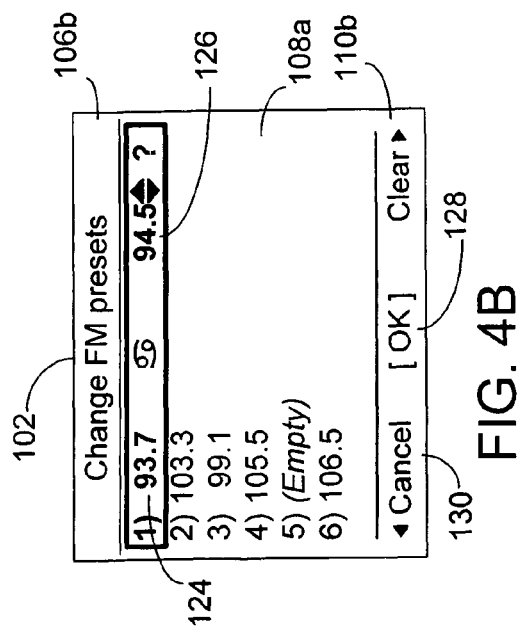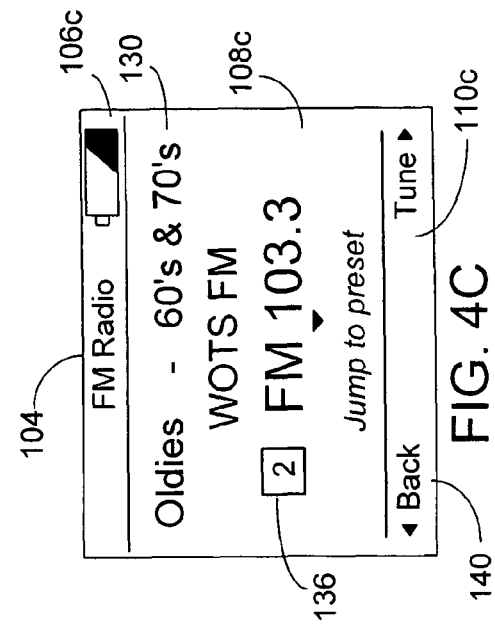

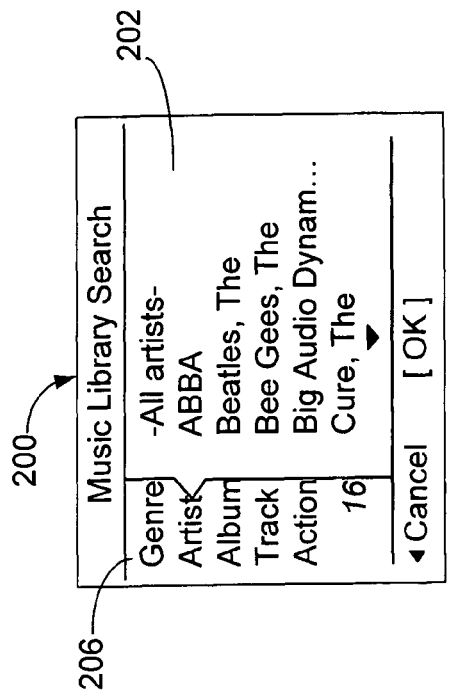

| Press vs. Press and hold | Rooms associated with particular remote | All other rooms on the multizone system | Action |
|---|---|---|---|
| Press | Not muted | Not muted | Mute particular room<br>Other rooms remain not muted |
| Press and hold | Not muted | Not muted | Mute particular room and all other rooms |
| Press | Muted | Not muted | Un-mute particular room<br>Other rooms remain not muted |
| Press and hold | Muted | Not muted | Particular room remains muted and all other rooms are muted |
| Press | Not muted | Muted | Mute particular room<br>Other rooms remain muted |
| Press and hold | Not muted | Muted | Particular room remains not muted, other rooms are un-muted |
| Press | Muted | Muted | Un-mute particular room, other rooms remain muted |
| Press and hold | Muted | Muted | Un-mute particular room and all other rooms |

FIG. 9

REMOTE CONTROLLING

BACKGROUND

This description relates to remote controlling.

In typical remote controlling, for example, of a music system, a remote control unit receives user commands and sends then to a base unit for action. For example, a command may instruct the base unit to switch from a compact disk music source to a selected FM radio station.

SUMMARY

In general, in one aspect, the invention features a method that includes providing, to a user of a control device, an indication of a value currently associated with a preset, and simultaneously providing an indication of a possible new value of the preset.

Implementations of the invention may include one or more of the following features. The preset is associated with works performed by a multi-media system. The multi-media system comprises an audio system. The indications comprise graphical items on a display. The display is part of the control device. The user is enabled to confirm the possible new preset value. The control device communicates with a second device to effect the confirmed new preset value. The value comprises an identifier of a station.

In general, in another aspect, the invention features a method that includes enabling a user of a control device to indicate a possible new value of a preset and to separately confirm the indication, and while the new value has been indicated and before the indication has been confirmed, changing an operation of another device in accordance with the indicated possible new value.

Implementations of the invention may include one or more of the following features. The value comprises an identifier of a station. The station comprises a radio station and the media player comprises a radio receiver. The station comprises a source of items to be performed, the source being configured to store the items for performance in response to the preset.

In general, in another aspect, the invention features a method that includes providing to a user of a control device, an indication of values of recently invoked presets, each of the preset values being associated with a source of works to be performed on an electronic device, different ones of the preset values being associated with different sources.

Implementations of the invention may include one or more of the following features. The user is enabled to identify one of the presets, and an electronic device is caused to change its state in response to the identification of the preset.

In general, in another aspect, the invention features a method that includes displaying values of possible selections at one level of a hierarchy of values, enabling a user to select one of the values at the one level of the hierarchy, and while at least a portion of the one level of the hierarchy is displayed, showing possible selections at a second, lower level of the hierarchy that correspond to the one of the values selected by the user, at least another portion of the one level being obscured. Implementations of the invention may include displaying an identification of the level of the hierarchy currently displayed.

In general, in another aspect, the invention features a method that includes enabling a user at a control device to enter a command to cause muting of only a portion of a sound system, and enabling the user to enter a command to cause muting of at least another portion of the sound system.

Implementations of the invention may include one or more of the following features. The command depends on a duration of the entering of the command by the user. The portion of the sound system includes a particular portion associated with the remote control device. The other portion of the sound system includes all portions of the sound system.

Other features and advantages of the invention will be apparent from the description and from the claims.

DESCRIPTION

Figure 8:
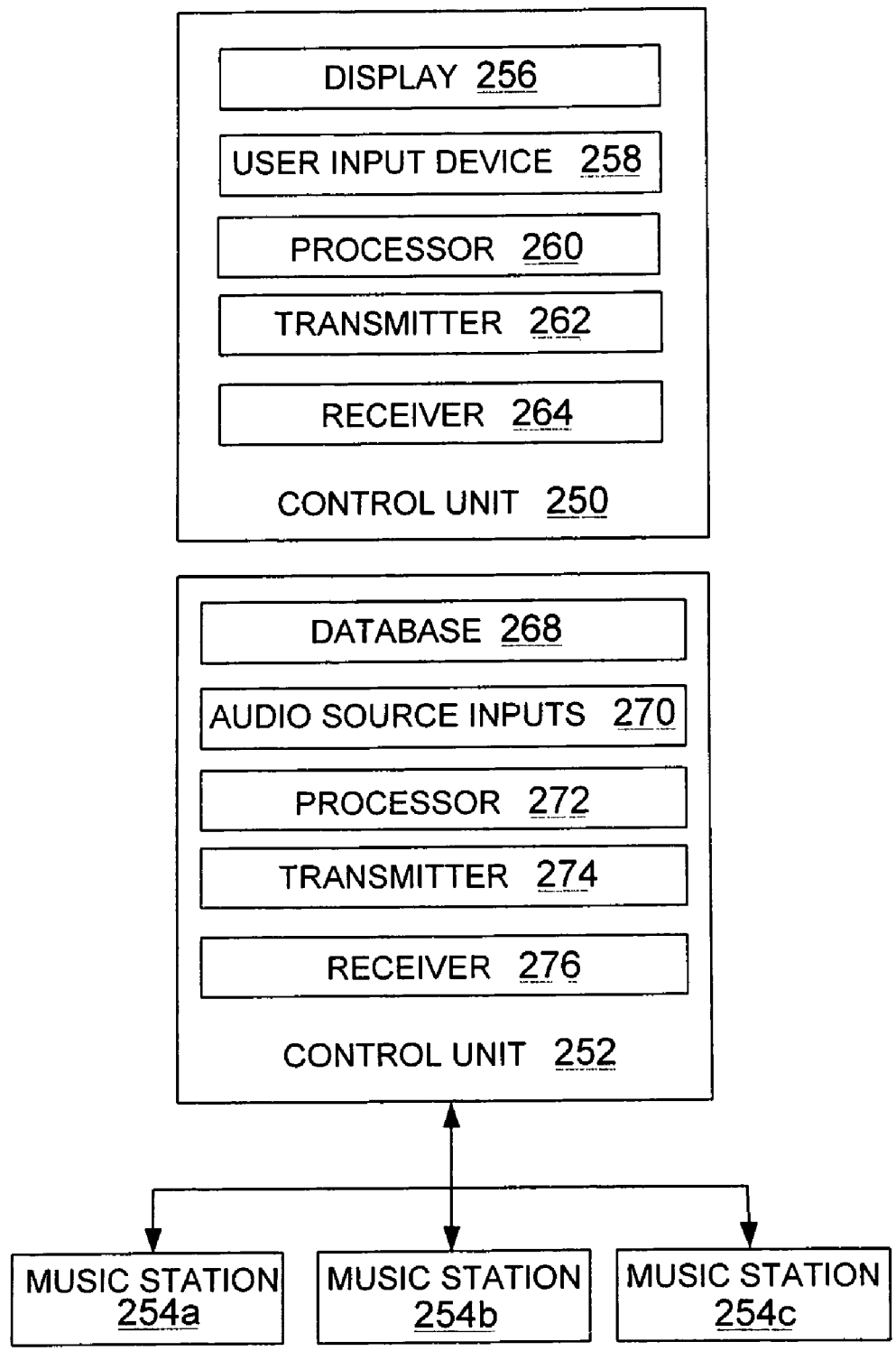

FIG. 1 is a block diagram of a multi-zone system.
FIG. 2 is a diagram of a control unit.
FIG. 3 shows a source select screen.
FIGS. 4A-4D show FM screens.
FIG. 5 shows a recent preset screen.
FIGS. 6A-6C shows a database navigation screen.
FIG. 7 shows a confirmation screen.
FIG. 8 is a block diagram of a system.
FIG. 9 is a table.

Some of the examples that follow involve music systems. However, the techniques can be applied to other audio systems, and to systems used to perform, for example, any kind of audio, video, image, or multimedia material.

As shown in FIG. 1, a multi-zone music system 10 includes music playing stations 12, 14, 16, 18, and 20 located in various zones, for example, various rooms of a house. A user controls the operation of the music system and the music playing stations using control units (e.g., remote controllers) 22, 24, 26, 28, and 30. A control unit may be associated with a particular zone and communicate with a base station 32 to control the music playing station of that zone or to control other music playing stations in the multi-zone music system. A control unit may also communicate directly with a music playing station if the playing station has the capability to receive communication from a control unit (e.g., through an infrared—IR—link). (Communication to the control unit will typically only come from the base station.) For example, a stand-alone device such as a radio and/or CD player with infrared communication capability may be used with such a system. When used in stand-alone mode, the radio or player is controlled by its dedicated control unit using (one way) IR communication. Such a radio and/or CD player may also be used as a music playing station in the multi-room system. In this case, the radio/player may be controlled locally using its dedicated IR remote, or through the base station when controlled by a control unit of the multi-zone music system. The control unit of the multi-zone music system may also directly control the music playing station through IR.

As shown in FIG. 2, a remote control unit 50 includes a display 52 and buttons for a user to select and control the operation of one or more music playing stations and the music system. The remote control unit 50 communicates wirelessly with a base unit 32 (FIG. 1), which relays user commands and information to be displayed, back and forth between the remote control unit and the music system.

Information is shown to a user on a display 52 and the user controls a music playing station and the music system by selecting from options presented on the display 52. The user makes selections from options displayed on display 52 using a forward arrow button 54, a backward arrow button 56, and an enter key 58. While the functions of these buttons can vary depending on the current set of options displayed on display 52, in general, the enter button 58 is used to select a particular option and the forward arrow button 52 and backward arrow button 56 are used for navigation between screens on the display 52.

The remote control unit 50 also includes other buttons that allow a user to control a music playing station and the music system. An on/off button 60 turns the remote control 50 and the music system on and off. A source button 62 launches a source selection screen (FIG. 3) on display 52 from which a user can select a source of audio from a list of available audio sources, for example, AM radio, FM radio, compact disk (CD)/digital versatile disk (DVD), cable/satellite, television, VCR, auxiliary sources, and local sources. A mute button 64 allows a user to mute the speakers in one or more zones of the multi-zone music system.

The remote control unit 50 also includes a presets button 66. When a user presses the presets button 66, a list of presets is displayed on the display 52. A preset list is, for example, a list of stations within a source, for example, FM stations within the source called FM, which have been pre-selected as being of interest. When a preset source is selected (by an indication given by the user), the music system changes its state in response to the indication or selection and plays from the station associated with the selected preset. When the source is a broadcast radio station, of course, once the user selects the station, he has no control over the selection or sequence of what is played.

On the other hand, if the source is, for example, a CD, the user can control the selection and sequence of playing of items from the CD using other control buttons. The control buttons include a back button 68 (for example, to "rewind" an item, such as a track on a CD, to an earlier location), a forward button 70 (for example, to advance the item to a later location), and a play/pause button 74 which can be invoked to cause the system to play or pause.

A user can cause the system to randomly shuffle the playing of items (also called tracks or works) belonging to sources that comprise libraries of items, using a shuffle button 76. For example, if the source is a CD, the shuffle button causes a random selection and order of tracks on the CD to be played. Another example would be to use the shuffle button in connection with works being performed using a preset (called a uMusic preset or a uMusic station or a uStation) associated with a so-called uMusic system referred to below, or a similar system. In any case, the system can store the state of the entire system (or a portion thereof) as part of a preset. For example, if the system is playing audio outputs 1 and 2 (see discussion below), a preset for the system can store the state of each stream and other control settings at a given time and can also remember which stream each music playing station was performing at that time.

A similar button 78 selects and plays music items from the current source that are similar to the item currently being performed. A whole CD button 82 causes an entire CD to be played. The whole CD that is played is the CD that contains the currently playing track when the whole CD button is pushed. The whole CD button applies when listening to a stored music source. A play list button 80 causes tracks in a play list to be played in a predetermined sequence. A minus selection button 86 is used to indicate a negative preference for the item currently being played. A plus selection button 88 is used to indicate a positive preference for the item currently being played. Buttons 76 through 88 enable a user to use functions that together are sometimes referred to as uMusic™, a system that permits a user to control the selection of future items from one or more libraries or sub-libraries of items that are available to be performed, based in part on his indicated preferences with respect to items that have been played. Additional information about such systems are contained in U.S. patent application Ser. No. 10/180,900, filed Jun. 25, 2002, and in U.S. patent application Ser. No. 10/746,301, filed Dec. 24, 2003, both incorporated in their entirety here. There may be other examples of systems that include at least some features similar to those of uMusic.

A volume control 72 can be invoked up or down to raise or lower the volume of items being played.

As shown in FIG. 3, in which the sources are stored music 91, FM radio 92, AM radio 93, CD/DVD 94, Cable/Satellite 95, and TV 96, the user can move up and down in the list of the sources using the enter button 58 by pressing the enter button up (e.g., toward the display 52) to navigate to sources prior to the currently highlighted category in the list and pressing the enter button 58 down (e.g., toward the other buttons) to move to sources subsequent to the currently highlighted category. As the user navigates up and down in the list, each of the sources is highlighted in turn. If the user navigates to the bottom source displayed on the screen (e.g., TV 96 in screen 90) and presses the enter button 58 down (e.g., toward the other buttons) other sources included in the list but not currently displayed on the screen are displayed, e.g., by scrolling. The user can select the highlighted source by pressing the enter button 58 straight in, perpendicularly to the surface of the remote, to select the highlighted item. Button 58 has three modes of operation; push up, push down (pushing toward and away from the display), and push in. Pressing the enter button 58 will "tune" the music system to the selected source and display a screen associated with the source (e.g., the screen of FIG. 4C).

The user can exit the source selection screen and return to the previous screen by pressing the backward arrow button 56 to invoke the cancel option on the navigation bar. (Note that the three buttons 54, 56, 58 are aligned with three positions along the navigation bar at the bottom of the screen to imply to the user that pressing one of the buttons will invoke the corresponding action identified in the bar.)

A music system may have multiple associated streams (audio outputs). Each music playing station can be assigned to play any of the streams. In one example, the system allows only two different streams (audio outputs). In one example, two streams are labeled audio 1 and audio 2. However, other numbers of streams are possible. The music system may support multiple zones. To select the output for a particular zone, each zone can be uniquely named such as zone 1 or zone 2. Zones usually refer to areas where audio can be produced. Usually, zones are rooms, but a zone could be a combination of rooms, or a portion of a room. A remote control is associated with a zone. Typically, one music playing station is associated with a zone, although multiple music playing stations may be associated with a single zone as well.

The source selection screen 90 is used to select the source for the audio 1 output (as indicated in the header at the top of the screen). The user can select a source for a different output by pressing the forward arrow button 54. If the user presses the forward arrow button, a source selection screen for audio 2 is displayed.

As shown in FIGS. 4A, 4B, and 4C, and 4D the screens 100, 102, 104, and 105 used in viewing, editing, and selecting a preset, include a header bar 106, a body 108, and a navigation bar 110. The header bar 106 displays a header associated with the content of the screen. The body 108 displays information. The user navigates and selects items in the body 108 based on the options included in the navigation bar.

In the example illustrated in FIG. 4A, the screen 100, called an FM preset selection screen, includes a list of six preset FM radio stations. A user navigates to the FM preset selection screen by pressing the preset button 66 on the remote control device 50 when the FM source is highlighted in the screen of FIG. 3. The list is organized by a preset number 112 and lists a band or frequency 114 of the preset stations. For example, the preset "2" is set to a radio station operating at a band or frequency of 103.3. If a particular preset number does not have a preset source associated with it, an "empty" message 116 is displayed next to the preset number 112 indicating that no value is stored for that preset. In the screen 100, the presets are identified by the station frequency 114; however, other information such as the station call letters could be used to identify the preset station.

The user can move up and down in the list of the stations by pressing the enter button up (e.g., toward the display 52) to navigate to items prior to the current item in the list and pressing the enter button 58 down (e.g., toward the other buttons) to move to items below to the currently highlighted item. As the user navigates up and down in the list, each of the stations is highlighted in turn. The user can invoke each of the options in the navigation bar using the forward arrow button 54, the enter button, or the backward arrow button 56 as appropriate.

From the FM preset selection screen, a user may cause a particular preset station to play, may exit, or may choose to edit a preset. To cause a station to play, the user navigates up and down to highlight the desired station and presses the enter button. To exit, the user presses the backward arrow button 56. To edit a preset, the user presses the forward arrow button 54.

When a user invokes the edit option, the FM preset edit screen 102 of FIG. 4B is displayed and the station that had been highlighted in screen 100 is automatically highlighted. When a station is highlighted, the screen also displays, to the right of the station, a number indicating a new value that will be substituted for the existing value when the user approves the edit.

While a station is highlighted, the user may enter (and may change) a new value 126 for the preset. Both the current preset 124 and the new value 126 are shown on display 52 at the same time. To enter a new value for the highlighted preset, the user presses the center button 58 up or down to tune up or down, or the user can press the back button 68 and the forward button 70 to seek back or forward, respectively. Pressing the back button 68 will seek the previous station having at least a minimum station strength and pressing the forward button 70 will seek the next station having at least the minimum station strength. Pressing and holding the back button 68 will rapidly decrease the tuner frequency and when the button is released, seek the previous station having at least the minimum strength. Similarly, pressing and holding the forward button 70 will rapidly increase the tuner frequency and when the forward button 70 is released seek the next station having at least the minimum strength. Pressing and holding the center button 58 up or down will also rapidly increase or decrease the frequency value.

Having the current preset value 124 and the new preset value 126 visible on display 52 at the same time makes it easier for the user to be certain that the change that will be effected is the one he wishes and allows him to retain the current setting easily if he chooses not to change it. The proposed change is not stored until the user invokes the "Ok" option in the navigation bar by pressing the enter button 58. Until that happens, he is able to continue to change the proposed new station value. He may also press the right arrow button 54 to completely clear a preset, marking it as (Empty).

As the user enters a new frequency (or changes it), and before he invokes the Ok option, the music system temporarily changes to the frequency of the new preset value 126 and plays that station. This auditory feedback allows the user to confirm the station and frequency are the ones desired before approving the changed preset value. To change the preset from the current preset frequency 124 to the new preset frequency 126 the user selects Ok 128 from the navigation bar 110b by pressing the enter button 58 on the remote device 50. If the user does not want to enter the change to the preset, the user selects Cancel 130 by pressing the back button 56 on remote control unit 50.

Returning to FIG. 4C, when a user selects (by invoking the Ok option) a particular preset from the FM preset selection screen 100, the remote control unit 50 generates a station display as shown in screen 104. The screen 104 includes information about the station 130 (for example, the type of music that it plays, the station's call letters and band 132, and the station frequency 138). Screen 104 also includes the preset number 136 associated with the station. To exit the station display screen and return to the select FM preset screen, the user selects the back option 140 from navigation bar 110c by pressing the back arrow button 56 on remote control device 50.

The user can toggle the current FM preset by pressing the center button 58 upward or downward. The user can also press the right arrow button to switch to a tuning screen 105 (FIG. 4D), where he can press the center button 58 up to increase the tuner frequency by one predetermined size step, or press the enter button 58 downward to decrease the frequency by one step (See FIGS. 4C and 4D). A typical step size used for tuning an FM radio is 100 Khz (or 0.1 Mhz), although other size steps are also possible.

Alternately, the user can seek a new station. Pressing the back button 68 seeks the previous station having a signal strength greater than a predetermined threshold, and pressing the forward button 70 seeks the next station with a signal strength exceeding a predetermined threshold. Pressing and holding the back button 68 rapidly decreases the tuner frequency and, when the user releases the back button 68, seeks the previous station having sufficient signal strength. Similarly, pressing and holding the forward button 70 rapidly increases the tuner frequency and upon release of the forward button 70 seeks the next station having sufficient signal strength.

In other examples, the preset lists need not be of FM radio stations, but could be for any other source (for example, uMusic stations, TV channels, or AM radio stations. The storage of multiple preset lists (associated with different sources) enables a user (or other users) to store favorite channels and selections for multiple sources. For example, if a system includes AM radio, FM radio, cable, satellite, television, VCR, auxiliary sources, and local sources, a preset list can be stored for each of the sources. Multiple preset lists may be associated with a single source. To navigate to a preset screen for a particular source, the user selects the source for the output of the system and presses preset button 66. For example, to view the list of AM presets, a user sets the music source to AM and presses the preset button.

Referring to FIG. 5, a screen 150 shows a list of recently accessed preset items, including presets from various sources (for example, presets that were invoked on different preset lists). A user navigates to the list of recently accessed presets by pressing the preset button 66 when a source that does not support presets has been previously selected (e.g., from the source select screen shown in screen 90) or by pressing the preset button immediately after turning the system on by pressing the on/off button. (Other methods or keystroke combinations for bringing up a recent history preset list may also be used.) If, when a source has been selected, the user presses the preset button 66, a preset select screen for the selected source is displayed instead of the recently accessed preset list. The preset select screen enables as user to pick a preset for the source. In the example of a preset select screen shown in screen 150, preset one 152 and preset six are set to FM radio stations, preset three 156 and preset five 160 are set to AM radio stations, and preset two 154 and preset four 158 are set to other sources (in this example, to uMusic related presets). The other sources can include any of the sources available to the music system. The user does not modify the list of recently accessed presets, rather, the list is updated by the system based on the most recent selections by the user.

In this example, the user has most recently accessed the FM radio station of 93.7, thus, FM 93.7 is stored as the most recent preset in preset one 152. The user can move up and down in the list of the most recently accessed presets using the enter button and pressing the button up (e.g., toward the display 52) to navigate to items prior to the currently highlighted item in the list and pressing the enter button 58 down (e.g., toward the other buttons) to move to items subsequent to the currently highlighted item. As the user navigates up and down in the list, each of the presets is highlighted in turn. In order to change the music system output to a preset on the list of presets, the user navigates among the list and highlights the desired preset. Once the desired preset is highlighted, the user presses enter button 58 to change the output of the system to the preset. When a preset included in the preset list is currently selected as the output for a music playing station, the output name is displayed beside the preset. Audio 1 is an output of the console, which is available to all music playing stations. When the remote associated with a particular playing station selects a preset, the source contained within the preset is applied to an audio output, and the music playing station is switched if necessary to that audio output. For example, the Jazz preset is currently playing on audio one in screen 150 as indicated by the "On Audio 1" designation 164. To exit the recent preset screen, the user presses the backward arrow button 54.

Referring to FIGS. 6A, 6B, and 6C, screens 170, 180 and 200 show the selection of stored music. Stored music sources could include large volume disks, or any device of location in which large numbers of items can be stored for use. The stored music could be stored in the music system itself or in a location that is external to the music system. Stored music can be hierarchically arranged in a database, for example arranged according to genre, artist, album, and track. (Additional information about storage systems, their relationship to music playing systems, and the creation and management of such a database is found in the two patent applications cited earlier.) A user selects a particular subset of all stored music by navigating in a hierarchy. While, in this example, a music database is arranged hierarchically, other databases can be navigated in a similar manner.

A user navigates to a stored music screen 170 by choosing the stored music source as described above in relation to FIG. 3. Information about the music stored in a stored music source may include, as shown on the stored music screen, a title 171, an artist 172, a preset 173, and a play state 174. The stored music screen also includes a navigation bar with a back option 175 and a library option 176. When a user selects the back option 175 by pressing the backward arrow 56, the previously viewed screen is displayed. When a user selects the library option 176 by pressing the forward arrow button 54, a music library search screen (shown in FIG. 6B) is displayed. Preset 173 in this example includes both the preset number and the user's name. A preset (for example, a preset for a stored music source) can be associated with a particular user. A preset can also, at the user's discretion, be associated with a mood, music style, or any other organizing principle.

The search screen 180 includes a listing of general categories used to search for music within the stored music source. In screen 180, the current genre setting 182 is rock/pop, the artist setting 184 is The Beatles, the album setting 188 is all albums, and the track setting 190 is all tracks. Screen 180 also displays the number of albums and tracks 192 associated with the current settings. If a user desires to play the selected set of music, the user selects the play option 194 from the navigation bar 196. If the user selects a set of items, such as a genre or an artist, the system plays items from that set in an order determined by how the user has set the uMusic features to work. The user can move up and down in the list of categories by pressing the enter button 58 up (e.g., toward the display 52) to navigate to items prior to the currently highlighted item in the list and pressing the enter button 58 down (e.g., toward the other buttons) to move to items subsequent to the currently highlighted item. As the user navigates up and down in the list, each of the items is highlighted in turn. If the user desires to edit the current settings for a particular category, the user navigates to the particular category (such that the category is highlighted) and presses the right arrow button 54 for the category to enter a selection screen, for example, the select artist screen 200.

Screen 200 is generated in response to a user highlighting the artist category 184 and pressing the forward arrow button 54 on remote control 50. Thus, a list of artists is displayed on a portion 202 of the body of the display. A remaining portion 206 of the display includes a partial view of the previous screen 180. Because the new screen does not completely overlay (i.e., obscure) the previous screen, the user is able to view the previous options and does not lose sight of where he navigated from to enter this screen. Thus, a portion of the higher level of the hierarchy is still visible, while another portion is obscured. A user navigates in the select artist screen by pressing the enter button 58 upward (e.g., toward the display 52) to navigate to items prior to the currently highlighted item or pressing the enter button 58 down (e.g., toward the other buttons) to move to items subsequent to the currently highlighted item. As the user navigates up and down in the list, each of the selections is highlighted in turn. To choose a particular selection, in this example an artist, the user navigates to the desired artist and presses the enter button 58. Upon making a selection in the selection screen shown in screen 200, the user returns to the previous level of the hierarchy as shown in screen 180. If the user decides not to make a selection, the user selects the cancel option 208 by pressing the backward arrow button 56. This selection also returns the user to the previous level of the hierarchy as shown in screen 200.

For each category in the search library screen 180, the user can navigate to a selection screen as described above for the artist category. A user can choose particular selections for each category, or can choose to play or rate all tracks associated with the category. He can also choose to add all tracks in a category to a playlist. The number of albums and tracks corresponding to the current search settings is displayed in the albums and tracks listing 192. The user can select to play the subset of stored music from the search by selecting the play option 194 by pressing the enter button. He can rate the subset using buttons 86 or 88, and can add them to a playlist using button 80. The hierarchical navigation could be more than two levels deep.

Although the example concerns a music hierarchy, the display method is not limited to this example. The partial overlaying of a screen to show a portion of the previous level in a hierarchy is applicable to any hierarchical selection menu. In addition, the display method can be used to navigate among multiple levels in the hierarchy. When multiple levels are used, a portion of each of the previous levels can remain visible, only the previous level can remain visible, or a set number of levels of the hierarchy can remain visible on the display 52.

Referring again to FIG. 1, in some cases a user may desire to mute the speakers in a particular room or rooms or mute the speakers for the entire system. In this example, each of the music playing stations 12, 14, 16, 18, and 20 is controlled by an associated remote control 22, 24, 26, 28, and 30 respectively. Each remote control 22, 24, 26, 28, and 30 includes a mute button 64 (as shown in FIG. 2) for muting the sound in the music system. The mute button generates different results based on how long the user depresses and holds the button as illustrated in the table of FIG. 9 and on the state of the system when the mute button is pressed.

If mute button 64 is pressed briefly the muting or un-muting will affect a single zone associated with the control unit. If the user presses and holds the mute button for a predetermined amount of time (e.g., 2-4 seconds) the muting or un-muting will affect all zones of the music system. It should also be noted that separate mute buttons could be used, where one button affects a single zone and the other button affects multiple zones.

If neither the sound in the zone associated with the remote control nor the sound in the other zones of the music system is muted, pressing the mute button 64 will mute the zone associated with the control unit. If the user presses and holds the mute button 64 the sound in all rooms of the multi-zone system is muted.

If the sound in the zone associated with the remote control is muted and the sound in the other zones of the music system are not muted, pressing the mute button 64 will un-mute the zone associated with the control unit and the other zones will remain not muted. If the user presses and holds the mute button 64 the sound in all rooms of the multi-zone system is muted.

If the sound in the zone associated with the remote control is not muted and the sound in the other zones of the music system is muted, pressing the mute button 64 will mute the zone associated with the control unit and the other zones will remain muted. If the user presses and holds the mute button 64, the zone associated with the control unit will be muted, and the other zones will remain muted.

If both the sound in the zone associated with the remote control and the sound in the other zones of the music system is muted, pressing the mute button 64 will un-mute the zone associated with the control unit and the other zones will remain muted. If the user presses and holds the mute button 64, the sound in all zones of the multi-zone system that had been muted by an earlier press and hold of the mute button are un-muted.

For example, if a user is in the kitchen and presses the mute button 64 on remote control device 22 the sound from the music playing station 12 located in the kitchen is muted. If the user holds the mute button the other rooms (e.g., the bath, bedroom 1, bedroom 2, and great room) are muted in addition to the kitchen. If the user subsequently presses the mute button (while all rooms are muted) the kitchen will un-mute but the bath, bedroom 1, bedroom 2, and great room will remain muted. If the user presses and holds the mute button, the kitchen will mute again. If the user holds the mute button all other rooms that are not muted will be muted. For example, if the user mutes all rooms, presses the mute button and un-mutes the kitchen, and subsequently presses and holds the mute button, all muted rooms will remain muted and the kitchen will be muted again.

A user may wish to turn off or turn on all zones in a multi-zone system. On/Off button 60 can be configured to operate in a similar fashion to mute button, where pressing On/Off button 60 causes the music playing station associated with that control to turn on or off, and pressing and holding On/Off button 60 causes multiple music playing stations (and in one embodiment all music playing stations) in a multi-zone system to turn on or off. Referring to FIG. 7, when a user wishes to turn off sound in all zones in a multi-zone system, the remote control device displays a confirmation message 218 as shown in screen shot 220. From this screen, the user can confirm the turning off of all rooms by selecting the "yes" option 222 in the navigation bar by pressing the enter button 58. If the user does not desire to turn off all rooms, the user selects the "No" option 224 from the navigation bar by pressing the backward arrow button 56. A similar confirmation screen allows a user to confirm a command to turn on all zones in the multi-zone system.

As shown in FIG. 8, to provide functionality as discussed above for the multi-zone music system the system includes one or more control units 250, a base unit 252, and multiple music playing stations 254. The control unit can be a remote control unit (shown in FIG. 2) or can be a display on a music playing station for the multi-zone music system. The control unit presents options to a user and the user selects to modify the output of one or more music playing stations 254 using the control unit. In order for the selections made by the user to affect the functionality of the music playing stations 254, the control unit 250 communicates with the base station 252 and the base station processes the communications and controls the individual music playing stations 254 based on the user input commands. Other configurations of base station, music playing stations, and control units would also be possible.

In order for a user to make selections, the control unit 250 includes a display 256 and user input devices 258. A user can view control options and make selections (by using the user input devices 258) based on the options displayed on display 256. The base station 252 can include a database 268 (e.g., a database of stored music) and a processor 272. Based on user-input commands, the base unit 252 can process the commands using the processor 272 and relay information back to the control unit 250 or to the music playing stations 254. The remote control unit 250 also includes a processor 260 that processes information from the base unit and controls display 256. The processor in the base station and the processor in the remote control unit each run a program to perform the functions as described above.

The control unit 250 sends a signal from a transmitter 262 in the control unit 250 to a receiver 276 in the base unit 252 to relay user-input commands from the control unit 250 to the base unit 252. Similarly, the base unit 252 sends a signal from a transmitter 274 in the base unit 252 to a receiver 264 in the control unit 250 to relay information from the base unit to the control unit.

The remote control processor and base unit processor can be implemented in digital electronic circuitry, or in computer hardware, firmware, software, or in combinations of them. The remote control processor and base unit processor can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The remote control can include multiple processes run on a base unit. The base unit generates results in response to user input. The results are sent to a client system and displayed as a user interface. A captured picture of the user interface is referred to as a screen.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the remote control can be implemented on a device having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Other embodiments are within the scope of the following claims. For example, the system could be used with other multimedia forms such as video and images.

What is claimed is:

1. A method comprising enabling a user of a remote control unit for controlling a sound signal source separated from the remote control unit to indicate on the remote control unit a value of possible new preset of a sound signal source and to separately confirm the indication, and, while the new value has been indicated but before the indication has been confirmed, to change an operation of another device separated from the remote control unit in accordance with the indicated possible new value and to provide auditory feed back to the user corresponding to the new value.

2. The method of claim 1 in which the preset is associated with a sound signal source in a multi-media system.

3. The method of claim 2 in which the multi-media system comprises an audio system.

4. The method of claim 1 in which the value comprises an identifier of a station.

5. The method of claim 4 in which the station comprises a radio station and another device comprises a radio receiver.

6. The method of claim 1 in which the sound signal source comprises a source of items to be performed, the source being configured to store the items for performance in response to the preset.

* * * * *